US011630709B2

(12) United States Patent
McClure et al.

(10) Patent No.: US 11,630,709 B2
(45) Date of Patent: *Apr. 18, 2023

(54) SYNCHRONIZATION CONSENSUS TOKEN SYSTEM AND METHOD

(71) Applicant: Visa International Service Association, San Francisco, CA (US)

(72) Inventors: Julie McClure, Parker, CO (US); Anil Chandupattla, Parker, CO (US); Abhishek Verma, Highlands Ranch, CO (US); Mark Picha, Littleton, CO (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/707,024

(22) Filed: Mar. 29, 2022

(65) Prior Publication Data

US 2022/0253345 A1 Aug. 11, 2022

Related U.S. Application Data

(63) Continuation of application No. 17/169,873, filed on Feb. 8, 2021, now Pat. No. 11,321,149.

(51) Int. Cl.
*G06F 3/00* (2006.01)
*G06F 9/54* (2006.01)
(Continued)

(52) U.S. Cl.
CPC ........... *G06F 9/541* (2013.01); *G06Q 20/405* (2013.01); *G06Q 20/023* (2013.01)

(58) Field of Classification Search
CPC ..................................................... G06F 9/54
(Continued)

(56) References Cited

U.S. PATENT DOCUMENTS 9,648,006 B2 5/2017 Lawson et al.
9,836,339 B1 12/2017 Engers et al.
(Continued)

FOREIGN PATENT DOCUMENTS

CN 110088747 * 9/2017

OTHER PUBLICATIONS

Alon Mishne, Typestate-Based Semantic Code Search over Partial Programs. (Year: 2012).*
(Continued)

*Primary Examiner* — Lechi Truong
(74) *Attorney, Agent, or Firm* — Kilpatrick Townsend & Stockton LLP (57) ABSTRACT

A method includes receiving, by a first computer from a second computer, a stateless API request message comprising update value data, a consensus token, and a user identifier. The first computer determines whether or not the consensus token matches a previously stored consensus token. If the consensus token matches the previously stored consensus token, the first computer retrieves stored value data from a value data database based on the user identifier. The first computer then updates the stored value data with the update value data. The first computer generates an API response message comprising an indication of the update. The first computer transmits, to the second computer, the API response message.

18 Claims, 5 Drawing Sheets

(51) Int. Cl.
  *G06Q 20/40*   (2012.01)
  *G06Q 20/02*   (2012.01)
(58) Field of Classification Search
  USPC .......................................................... 719/328
  See application file for complete search history.

(56) References Cited

U.S. PATENT DOCUMENTS

| | | | |
|---|---|---|---|
| 10,191,961 B2 | 1/2019 | Williams et al. | |
| 11,005,853 B1 | 5/2021 | Agarwal et al. | |
| 11,093,236 B1* | 8/2021 | Gülsoy | G06F 8/656 |
| 2002/0166001 A1 | 11/2002 | Cheng et al. | |
| 2008/0020341 A1 | 1/2008 | Krumbholz | |
| 2012/0054845 A1 | 3/2012 | Rodriguez et al. | |
| 2013/0103977 A1 | 4/2013 | Zimmermann | |
| 2015/0242847 A1 | 8/2015 | Erdelyi et al. | |
| 2015/0324386 A1 | 11/2015 | Calder et al. | |
| 2017/0161973 A1 | 6/2017 | Katta et al. | |
| 2017/0331832 A1 | 11/2017 | Lander et al. | |
| 2017/0352019 A1 | 12/2017 | Li et al. | |
| 2018/0139262 A1* | 5/2018 | Li | H04L 67/10 |
| 2019/0158390 A1* | 5/2019 | Ahuja | H04L 47/70 |
| 2019/0347663 A1 | 11/2019 | Li | |
| 2020/0250709 A1* | 8/2020 | Swartz | G06Q 30/0249 |
| 2020/0267090 A1 | 8/2020 | Cahill et al. | |
| 2020/0396077 A1 | 12/2020 | Wojcik | |
| 2022/0086238 A1* | 3/2022 | Oh | H04L 67/142 |

OTHER PUBLICATIONS

U.S. Appl. No. 17/169,873, "Non-Final Office Action", dated Sep. 2, 2021, 21 pages.

U.S. Appl. No. 17/169,873, "Notice of Allowance", dated Jan. 11, 2022, 10 pages.

St. Johns, "Authentication Server", 4.1 RFC931, Available Online at srv.unisa.it/professori/ads/corso-security/www/CORSO-0001/RlievazioneScanning/rfc931.html, Jan. 1985, 5 pages.

Tapas et al., "Blockchain-Based IoT-Cloud Authorization and Delegation", IEEE International Conference on Smart Computing, Jun. 2018, 6 pages.

* cited by examiner

SYNCHRONIZATION CONSENSUS TOKEN SYSTEM AND METHOD

CROSS-REFERENCES TO RELATED APPLICATIONS

This application is a continuation of U.S. application Ser. No. 17/169,873 filed Feb. 8, 2021, which is herein incorporated by reference in its entirety for all purposes.

BACKGROUND

Computer systems can communicate with one another to convey information. Usually, computer systems initialize communication sessions with one another to securely communicate information.

Communication sessions have a number of problems. For example, sessions make it harder to replicate and fix bugs, sessions can't be bookmarked because everything is stored on the server side (of a client/server communication session), and sessions are not readily scalable in environments that include many communicating computers.

Communications via APIs can be better than communications via sessions. However, typical API calls and responses utilize stateful systems. Stateful programming is introduces many problems. For example, during stateful API communication, a responding computer needs to respond based upon the state of the requesting computer. The state the requesting computer will alter the response. During these stateful API communications, the responding computer cannot determine if the requesting computer has crashed or is disconnected. Furthermore, the responding computer may not know how long to leave the stateful API communication open.

Embodiments of the disclosure address this problem and other problems individually and collectively.

SUMMARY

One embodiment is related to a method comprising: receiving, by a first computer from a second computer, a stateless API request message comprising update value data, a consensus token, and a user identifier; determining, by the first computer, whether or not the consensus token matches a previously stored consensus token; if the consensus token matches the previously stored consensus token, retrieving, by the first computer, stored value data from a value data database based on the user identifier; updating, by the first computer, the stored value data with the update value data; generating, by the first computer, an API response message comprising an indication of the update; and transmitting, by the first computer to the second computer, the API response message.

Another embodiment is related to a first computer comprising: a processor; and a computer-readable medium coupled to the processor, the computer-readable medium comprising code executable by the processor for implementing a method comprising: receiving, from a second computer, a stateless API request message comprising update value data, a consensus token, and a user identifier; determining whether or not the consensus token matches a previously stored consensus token; if the consensus token matches the previously stored consensus token, retrieving stored value data from a value data database based on the user identifier; updating the stored value data with the update value data; generating an API response message comprising an indication of the update; and transmitting, to the second computer, the API response message.

Another embodiment is related to a second computer comprising: a processor; and a computer-readable medium coupled to the processor, the computer-readable medium comprising code executable by the processor for implementing a method comprising: authorizing an amount for an interaction performed by a user of a user device associated with a user identifier; updating first stored value data based on the amount; generating a stateless API request message comprising update value data, a consensus token, and the user identifier; providing the stateless API request message to a first computer, wherein the first computer determines whether or not the consensus token matches a previously stored consensus token, and if the consensus token matches the previously stored consensus token, updates second stored value data with the update value data, and generates an API response message; and receiving the API response message from the first computer including an indication of the update.

Another embodiment of the invention includes a method comprising: authorizing an amount for an interaction performed by a user of a user device associated with a user identifier; updating first stored value data based on the amount; generating a stateless API request message comprising update value data, a consensus token, and the user identifier; providing the stateless API request message to a first computer, wherein the first computer determines whether or not the consensus token matches a previously stored consensus token, and if the consensus token matches the previously stored consensus token, updates second stored value data with the update value data, and generates an API response message; and receiving the API response message from the first computer including an indication of the update.

Further details regarding embodiments of the disclosure can be found in the Detailed Description and the Figures.

DETAILED DESCRIPTION

Prior to discussing embodiments of the disclosure, some terms can be described in further detail.

A "user" may include an individual. In some embodiments, a user may be associated with one or more personal accounts and/or mobile devices. The user may also be referred to as a cardholder, account holder, or consumer in some embodiments.

A "user device" may be a device that is operated by a user. Examples of user devices may include a mobile phone, a smart phone, a card, a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

A "user identifier" can include any piece of data that can identify a user. A user identifier can comprise any suitable alphanumeric string of characters. In some embodiments, the user identifier may be derived from user identifying information. In some embodiments, a user identifier can include an account identifier associated with the user.

"Value data" can include an piece of information regarding an amount denoted by a magnitude. Value data can include an information of an amount of something. Value data can be an amount of data, an amount of funds (e.g., a balance), an amount of items remaining, etc. Value data can be maintained by a computer and may be associated with a user identifier and/or a user account.

A "resource" can include anything that may be used or consumed. Some non-limiting examples of a resource may be a good or service, a secure location such as a building or a transit terminal or platform, or secure data.

A "resource provider" may be an entity that can provide a resource. Examples resource providers include merchants, online or other electronic retailers, access devices, secure data access points, etc. A "merchant" may be an entity that engages in transactions and sells goods or services, or provide access to goods or services. A "resource provider computer" may be any computing device operated by a resource provider.

An "access device" may be any suitable device that provides access to a resource. An access device may be in any suitable form. Some examples of access devices include POS or point of sale devices (e.g., POS terminals), cellular phones, personal digital assistants (PDAs), personal computers (PCs), tablet PCs, hand-held specialized readers, set-top boxes, electronic cash registers (ECRs), automated teller machines (ATMs), virtual cash registers (VCRs), kiosks, security systems, access systems, and the like.

An "interaction" may include a reciprocal action or influence. An interaction can include a communication, contact, or exchange between parties, devices, and/or entities. Example interactions include a transaction between two parties and a data exchange between two devices. In some embodiments, an interaction can include a user requesting access to secure data, a secure webpage, a secure location, and the like. In other embodiments, an interaction can include a payment transaction in which two devices can interact to facilitate a payment.

"Interaction data" may be data associated with an interaction. For example, an interaction may be a transfer of a digital asset from one party to another party. In some embodiments, an interaction can include a transaction between a user and a resource provider. Interaction data, for example, may include a transaction amount. In some embodiments, interaction data can indicate different entities that are party to an interaction as well as value or information being exchanged. Interaction data can include an interaction amount, information associated with a sender (e.g., a token or account information, an alias, a device identifier, a contact address, etc.), information associated with a receiver (e.g., a token or account information, an alias, a device identifier, a contact address, etc.), one-time values (e.g., a random value, a nonce, a timestamp, a counter, etc.), and/or any other suitable information. An example of interaction data can be transaction data.

A "network processing computer" may include a server computer used for processing network data. In some embodiments, the network processing computer may be coupled to a database and may include any hardware, software, other logic, or combination of the preceding for servicing the requests from one or more client computers. The network processing computer may in a processing network, which may include data processing subsystems, networks, and operations used to support and deliver authorization services, exception file services, and clearing and settlement services. An exemplary processing network may include VisaNet™. Networks that include VisaNet™ are able to process credit card transactions, debit card transactions, and other types of commercial transactions. VisaNet™, in particular, includes an integrated payments system (Integrated Payments system) which processes authorization requests and a Base II system, which performs clearing and settlement services. The processing network may use any suitable wired or wireless network, including the Internet.

"Credentials" may comprise any evidence of authority, rights, or entitlement to privileges. For example, access credentials may comprise permissions to access certain tangible or intangible assets, such as a building or a file. Examples of credentials may include passwords, passcodes, or secret messages. In another example, payment credentials may include any suitable information associated with and/or identifying an account (e.g., a payment account and/or a payment device associated with the account). Examples of account information may include an "account identifier" such as a PAN (primary account number or "account number"), a token, a subtoken, a gift card number or code, a prepaid card number or code, a user name, an expiration date, a CVV (card verification value), a dCVV (dynamic card verification value), a CVV2 (card verification value 2), a CVC3 card verification value, etc. An example of a PAN is a 16-digit number, such as "4147 0900 0000 1234".

A "cryptogram" may include a piece of obscured text such as encrypted text. A cryptogram may be formed by encrypting input data with an encryption key such as a symmetric encryption key. In some embodiments, a cryptogram is reversible so that the inputs that are used to form the cryptogram can be obtained using the same symmetric key to perform a decryption process. In some embodiments, if input data is encrypted using a private key of a public/private key pair, the cryptogram may also be a digital signature. A digital signature may be verified with a public key of the public/private key pair. In some embodiments, a cryptogram may include a dCVV (dynamic card verification value).

A "consensus token" can include value that aids in attaining a general agreement. A consensus token can include a value that can provide for two devices to reach consensus on the data associated with the consensus token. A consensus token can allow two or more devices to reach consensus on value data maintained separately at each device. In some embodiments, a consensus token can be a value provided by a first computer to a second computer such that the second computer can determine which stored value data the first computer is referencing during a stateless API request. In some embodiments, the consensus token can be an alphanumeric value associated with a user. In some embodiments, a consensus token can be a value that references a previous interaction performed by a user of a user account. For example, a user can perform a first interaction (previous) and then later perform a second interaction (current). For the second interaction, the consensus token can be equal to a value utilized during the first interaction. In this case, the consensus token can be an interaction identifier.

The term "verification" and its derivatives may refer to a process that utilizes information to determine whether an underlying subject is valid under a given set of circumstances. Verification may include any comparison of information to ensure some data or information is correct, valid, accurate, legitimate, and/or in good standing.

An "authorization request message" may be an electronic message that requests authorization for an interaction. In some embodiments, it is sent to a transaction processing computer and/or an issuer of a payment card to request authorization for a transaction. An authorization request message according to some embodiments may comply with International Organization for Standardization (ISO) 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction value, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., POS equipment) that indicates approval of the transaction. The code may serve as proof of authorization.

An "authorizing entity" may be an entity that authorizes a request. Examples of an authorizing entity may be an issuer, a governmental agency, a document repository, an access administrator, etc.

An "issuer" may typically refer to a business entity (e.g., a bank) that maintains an account for a user. An issuer may also issue payment credentials stored on a user device, such as a cellular telephone, smart card, tablet, or laptop to the consumer.

An "API" or "application programming interface" can include computer code or other data on a computer-readable medium that may be executed by a processor to facilitate interaction between software components. For example, an API can facilitate interaction between a network processing computer and an authorizing entity computer.

A "stateless API" can include an API that does not rely upon previous request and responses to process current requests and responses. In some embodiments, statelessness may imply that each request happens in complete isolation from other requests. For example, when a client makes a stateless API request, the client includes all information necessary for the server to fulfill that request. The server does not rely on information from previous requests and no communication session needs to be established prior to communicating via the stateless API. For example, a stateless API may not retain session-oriented state information between request messages.

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

Embodiments of the disclosure relate to synchronization of data tracked by multiple computers. For example, a network processing computer and an authorizing entity computer can maintain disparate instances of value data while maintaining consensus. To do so, an authorizing entity computer can communicate with a network processing computer using a stateless API. From the authorizing entity computer's point of view, it cannot see/track the processing of stateless API request messages due to the nature of stateless APIs. A synchronization consensus token can be included in the API request to ensure that the authorizing entity computer and the network processing computer are updating the value data (e.g., a user's balance) correctly over multiple interactions.

In some embodiments, the synchronization consensus token can advantageously be a previous interaction identifier (e.g., a previous transaction identifier). When a previous interaction identifier is used as the synchronization consensus token, it can prevent double spending when, for example, the authorizing entity computer submits a stateless API request message more than once. This might occur in cases if the authorizing entity computer did not receive a response from the network processing computer within an expected time period.

Figure 1:
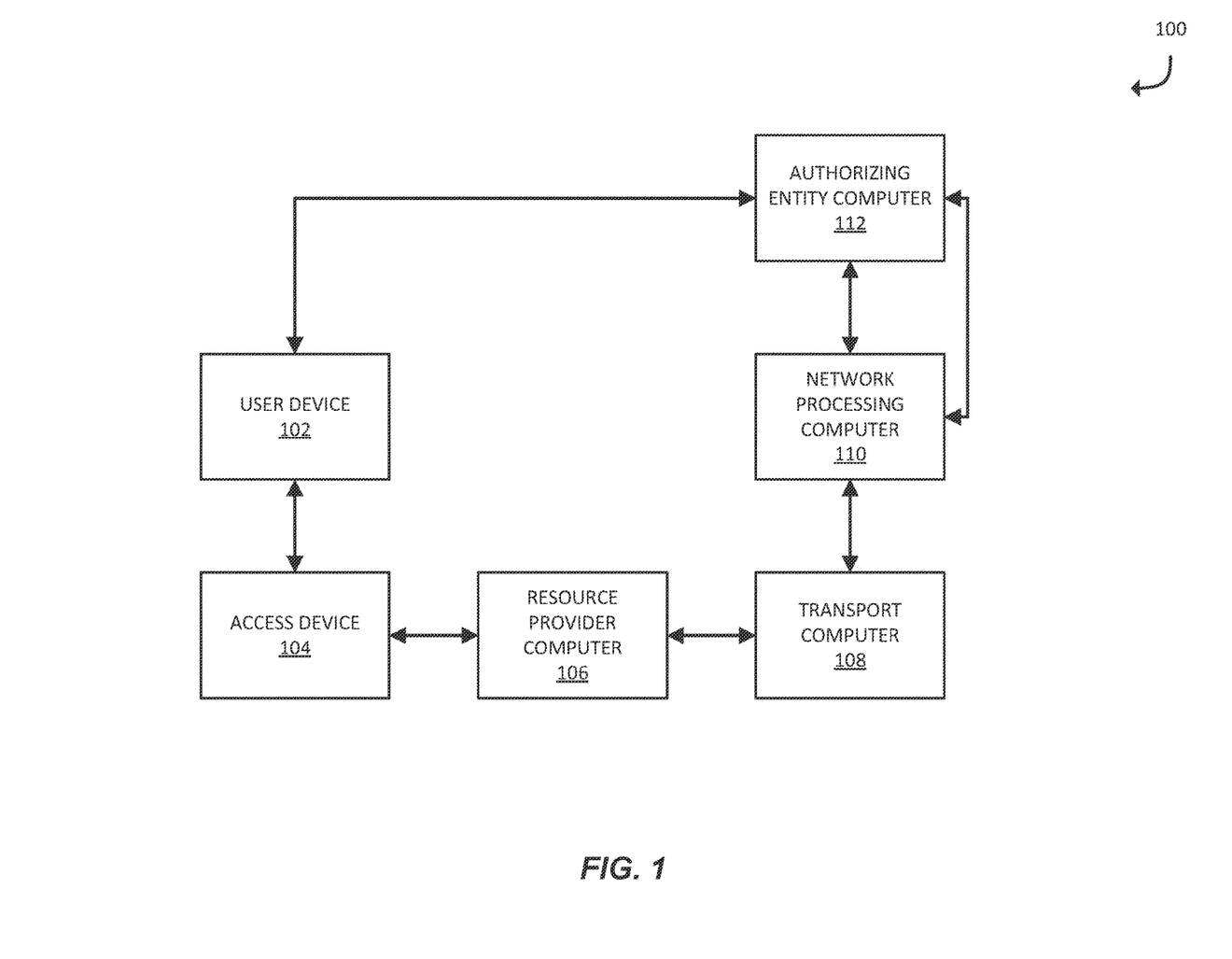
FIG. 1 shows a block diagram of a synchronization consensus system according to embodiments.

FIG. 1 shows a system 100 according to embodiments of the disclosure. The system 100 comprises a user device 102, an access device 104, a resource provider computer 106, a transport computer 108, a network processing computer 110, and an authorizing entity computer 112. The user device 102 can be in operative communication with the access device 104 and the authorizing entity computer 112. The access device 104 can be in operative communication with the resource provider computer 106, which may be in operative communication with the transport computer 108. The network processing computer 110 can be in operative communication with the transport computer 108 and the authorizing entity computer 112.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1.

Messages between at least the devices in the system 100 depicted in FIG. 1 can be transmitted using a secure communications protocols such as, but not limited to, File Transfer Protocol (FTP); HyperText Transfer Protocol (HTTP); Secure Hypertext Transfer Protocol (HTTPS), SSL, ISO (e.g., ISO 8583) and/or the like. The communications network may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

The user may conduct a transaction at the resource provider (e.g., a merchant) using a user device 102 (e.g., a mobile device, etc.). The interaction may be a payment transaction (e.g., for the purchase of a good or service), an access interaction (e.g., for access to a transit system), or any other suitable interaction. The user device 102 can interact with an access device 104 at a resource provider location associated with resource provider computer 106. For example, the user may tap the user device 102 against an NFC reader in the access device 104. Alternately, the user may indicate account information to the resource provider electronically, such as in an online interaction. In some cases, the user device 102 may transmit, to the access device 104, an account identifier (e.g., an interaction token, a user account credential, a cryptogram, etc.).

The access device 104 can be a device that provides access to a remote system during an interaction. The access device 104 may be used for communicating, from a user device 102, to a resource provider computer 106. The access device 104 can be located at a resource provider location, in some embodiments. As an example, the access device 104 can be a point of sale terminal at a store maintained by the resource provider.

The resource provider computer 106 can be operated by a resource provider (e.g., a merchant, a payment service provider, a location access service, etc.). In some embodiments, the resource provider computer 106 may include the access device 104 or a point of sale device. In some embodiments, the resource provider computer 106 may include a web server computer that may host one or more websites associated with the resource provider. In some embodiments, the resource provider computer 106 may be configured to send/receive data (e.g., an authorization request message, an authorization response message, etc.) to/from user device 102, the access device 104, and/or the transport computer 108.

In order to authorize an interaction, an authorization request message may be generated by the access device 104 or the resource provider computer 106 and then forwarded to the transport computer 108.

The transport computer 108 can be associated with a business entity (e.g., a commercial bank) that has a relationship with a particular resource provider (e.g., a merchant) or other entity and that may be involved in the interaction process. The transport computer 108 may issue and manage accounts for resource providers and exchange amounts with the authorizing entity computer 112 on behalf of the resource provider. Some entities can perform both transport computer 110 and authorizing entity computer 112 functions.

After receiving the authorization request message, the transport computer 108 can transmit the authorization request message to the network processing computer 110.

In some embodiments, the network processing computer 110 can determine whether or not to authorize the interaction on behalf of the authorizing entity computer 112. The network processing computer 110 can authorize or decline interactions locally based on one or more predetermined rules. For example, the network processing computer 110 can authorize or decline interactions that meet prerequisites as indicated in the predetermined rules (e.g., if the interaction is less than $50, has a low risk score, is at a certain location, involves a particular merchant and/or user, and/or any other suitable rules). The network processing computer 110 can then generate an indication of whether or not the interaction is authorized. The network processing computer 110 can generate an authorization response message comprising the indication of whether or not the interaction is authorized and may provide the authorization response message to the transport computer 108. In some cases, this can be referred to as "stand-in processing."

In such a case, the network processing computer 110 can update value data that is associated with the account (e.g., a balance). The value data can include an amount of data, an amount of funds, etc. The balance can be updated and maintained locally at the network processing computer 110 even though the user account associated with the user is updated and maintained by the authorizing entity computer 112. The network processing computer 110 can be configured to communicate with the authorizing entity computer 112 after the interaction to notify the authorizing entity computer 112 of any updates made to a balance maintained by the network processing computer 110. For example, the network processing computer 110 can provide a synchronization consensus token and update value data to the authorizing entity computer 112 (as described in further detail in regards to FIG. 3) to notify the authorizing entity computer 112 of the change in balance maintained by the network processing computer 110.

In other embodiments, the network processing computer 110 does not make any authorization decision, and can forward the authorization request message to the corresponding authorizing entity computer 112 associated with an authorizing entity associated with the user's account.

If the processing network computer did not make the authorization decision, after the authorizing entity computer 112 receives the authorization request message, the authorizing entity computer 112 can determine whether or not to authorize the interaction. The authorizing entity computer 112 can generate an indication of whether or not the interaction is authorized and include the indication into an authorization response message. The authorizing entity computer 112 can then send the authorization response message back to the network processing computer 110 to indicate whether the current indication is authorized (or not authorized).

The authorizing entity computer 110 may be configured to authorize any suitable request, including access to data, access to a location, or approval for a payment. In some embodiments, the authorizing entity computer 112 may be operated by an account issuer. Typically, the issuer is an entity (e.g., a bank) that issues and maintains an account of a user. The account may be a credit, debit, prepaid, or any other type of account.

The network processing computer 110 can then forward the authorization response message to the transport computer 108.

After receiving the authorization response message, the transport computer 108 then sends the authorization response message to the resource provider computer 106.

After the resource provider computer 106 receives the authorization response message, the resource provider computer 106 may then provide the authorization response message to the user device 102, via the access device 104 in some cases. The authorization response message may be displayed by the access device 104, or may be printed out on a physical receipt. Alternately, if the interaction is an online interaction, the resource provider computer 106 may provide a web page or other indication of the authorization response message as a virtual receipt. The receipts may include interaction data for the interaction.

At the end of the day, a normal clearing and settlement process can be conducted by the network processing computer 110. A clearing process is a process of exchanging financial details between an acquirer and an authorizing entity to facilitate posting to a user's payment account and reconciliation of the user's settlement position.

In some embodiments, the user of the user device 102 can perform a process, such as an interaction, with the authorizing entity computer 112 directly. For example, the user device 102 can request a transfer of an amount from a first user account to a second user account, where the authorizing entity computer 112 can maintain both the first user account and the second user account. The authorizing entity computer 112 can perform the transfer without communicating with the network processing computer 110 during the transfer. The authorizing entity computer 112 can update a balance and account associated with the user based on the transfer requested by the user.

The authorizing entity computer 112 can be configured to communicate with the network processing computer 110 after the interaction to notify the network processing computer 110 of any updates made to a balance maintained by the authorizing entity computer 112. For example, the authorizing entity computer 112 can provide a consensus token and update value data to the network processing computer 110 (as described in further detail in regards to FIG. 3) to notify the network processing computer 110 of the change in balance maintained by the authorizing entity computer 112.

Figure 2:
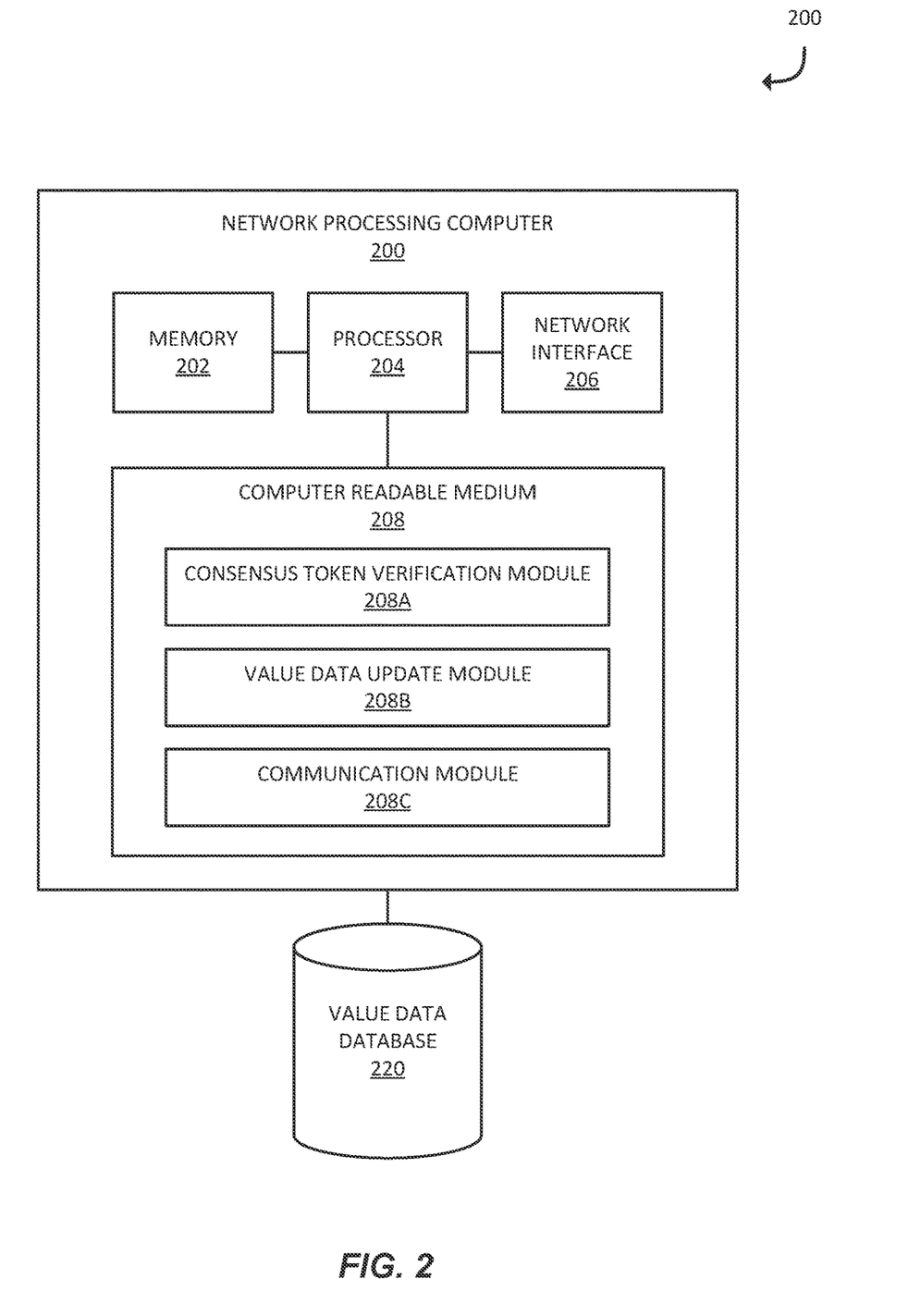
FIG. 2 shows a block diagram of components of a network processing computer according to embodiments.

FIG. 2 shows a block diagram of a network processing computer 200 according to embodiments. The exemplary network processing computer 200 may comprise a processor 204. The processor 204 may be coupled to a memory 202, a network interface 206, and a computer readable medium 208. The computer readable medium 208 can comprise a consensus token verification module 208A, a value data update module 208B, and a communication module 208C. Further, the network processing computer 200 can be in operative communication with a value data database 220.

The memory 202 can be used to store data and code. The memory 202 may be coupled to the processor 204 internally or externally (e.g., cloud based data storage), and may comprise any combination of volatile and/or non-volatile memory, such as RAM, DRAM, ROM, flash, or any other suitable memory device. For example, the memory 202 can store consensus tokens, previous consensus tokens, value data, user identifiers, etc.

The computer readable medium 208 may comprise code, executable by the processor 204, for performing a method comprising: receiving, by a first computer from a second computer, a stateless API request message comprising update value data, a consensus token, and a user identifier; determining, by the first computer, whether or not the consensus token matches a previously stored consensus token; if the consensus token matches the previously stored consensus token, retrieving, by the first computer, stored value data from a value data database based on the user identifier; updating, by the first computer, the stored value data with the update value data; generating, by the first computer, an API response message comprising an indication of the update; and transmitting, by the first computer to the second computer, the API response message.

The consensus token verification module 208A may comprise code or software, executable by the processor 204, for verifying a consensus token. The consensus token verification module 208A, in conjunction with the processor 204, can verify consensus token received in a API request message. The consensus token verification module 208A, in conjunction with the processor 204, can verify a consensus token by determining if the received consensus token matches a stored consensus token.

For example, in some embodiments, a particular user may be associated with a consensus token. The consensus token verification module 208A, in conjunction with the processor 204, can obtain the stored consensus token associated the user and then compare the stored consensus token to the received consensus token. If the stored consensus token matches the received consensus token, then the consensus token verification module 208A, in conjunction with the processor 204, can determine that the received consensus token is verified.

In other embodiments, a current consensus token may relate to a previous interaction. For example, a current consensus token may be the same as an interaction identifier of the last interaction. When determining whether or not a received consensus token if valid, the consensus token verification module 208A, in conjunction with the processor 204, can obtain the interaction identifier of the last interaction (also referred to as previous interaction identifier). The consensus token verification module 208A, in conjunction with the processor 204, can compare the interaction identifier of the last interaction to the received consensus token. If the interaction identifier of the last interaction matches the received consensus token, then the consensus token verification module 208A, in conjunction with the processor 204, can determine that the consensus token is verified. If the interaction identifier of the last interaction does not match the received consensus token, then the consensus token verification module 208A, in conjunction with the processor 204, can determine that the consensus token is not verified.

The value data update module 208B can include may comprise code or software, executable by the processor 204, for updating value data. The value data update module 208B, in conjunction with the processor 204, can maintain value data for each user of a plurality of users. The value data can be any suitable data related to the user that may change over time. For example, the value data can be a balance or an amount of available data. The value data update module 208B, in conjunction with the processor 204, can update stored value data using update value data received in an API request message. For example, the value data can be a value of 110 GB (gigabytes). After the consensus token verification module 208A, in conjunction with the processor 204, verifies a consensus token received along with update value data, the value data update module 208B, in conjunction with the processor 204, can update the value data with the user update value data. As an example, the update value data may be a value of 1,000 GB. The value data update module 208B, in conjunction with the processor 204, can determine updated value data to be a value to 1,110 GB.

The communication module 208C may be configured or programmed to perform some or all of the functionality associated with receiving, sending, and generating electronic messages for transmission to or from any of the entities shown in FIG. 1. When an electronic message is received by the network processing computer 200 via the network interface 206, it may be passed to the communication module 208C. The communication module 208C may identify and parse the relevant data based on a particular messaging protocol used by the devices of FIG. 1. As an example, the communication module 208C can include an API end point that processes API request messages and may work in conjunction with the consensus token verification module 208A, the value data update module 208B, and the processor 204 to generate an API response message based on the processing performed by the aforementioned components.

The communication module 208C may receive information from one or more of the modules in the network processing computer 200 and generate an electronic message in an appropriate data format in conformance with a transmission protocol used so that the message may be sent to one or more entities within the system 100 (e.g., to the authorizing entity computer 112). The electronic message may then be passed to the authorizing entity computer 112 via an API response message.

As an illustrative example, the API request message can have a format as illustrated in Table 1.

TABLE 1

| Example API request message format | | |
|---|---|---|
| Field: Type | Description | Potential Valid Values and Constraints |
| { | | |
| "idempotentId": string | Unique ID for this request. In case of any system failure or retry events, the client is expected to pass the same ID. This ID can instruct the system to execute this operation one time. | Can also serve as an idempotent check for duplicate issuance with a Min length of 1 and a Max length of 40. Type = String AN (which may be processed according to an ISO standard) |
| "balanceUpdateDatetime": string | Date/time of when available and ledger balances on the client's system were updated. This timestamp can be used to validate the current balances. Must be after the existing value in the account. Example: 2019-10-03T21:44:47.038Z | UTC Format: yyyy-MM-dd'T'hh:mm:ss.SSS'Z Can be populated when the account has an available balance. |
| "availableBalance": double | Available balance in default account currency. | Balance can be a negative amount |
| "ledgerBalance": double | Ledger balance in default account currency. | Balance can be a negative amount |
| "consensusToken": String | Unique interaction ID for the last ISO 20022 advice message sent to a client in, for example, a body.tx.txId.CardIssrRefData field. | If provided, this value can be an exact match to the last financial transaction applied to the account. |
| } | | |

The API response message provided in response to the API request message may not have a response body for a successful value data update (e.g., a successful balance sync). The API response message can be a response message that can include an indication that the value data was updated.

The network interface 206 may include an interface that can allow the network processing computer 200 to communicate with external computers. The network interface 206 may enable the network processing computer 200 to communicate data to and from another device (e.g., a transport computer, an authorizing entity computer, etc.). Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

In some embodiments, the network processing computer 200 may be in operative communication with the value data database 220. The value data database 220 can include any suitable database. The database may be a conventional, fault tolerant, relational, scalable, secure database such as those commercially available from Oracle™ or Sybase™. The value data database 220 can store value data for one or more users.

Figure 3:
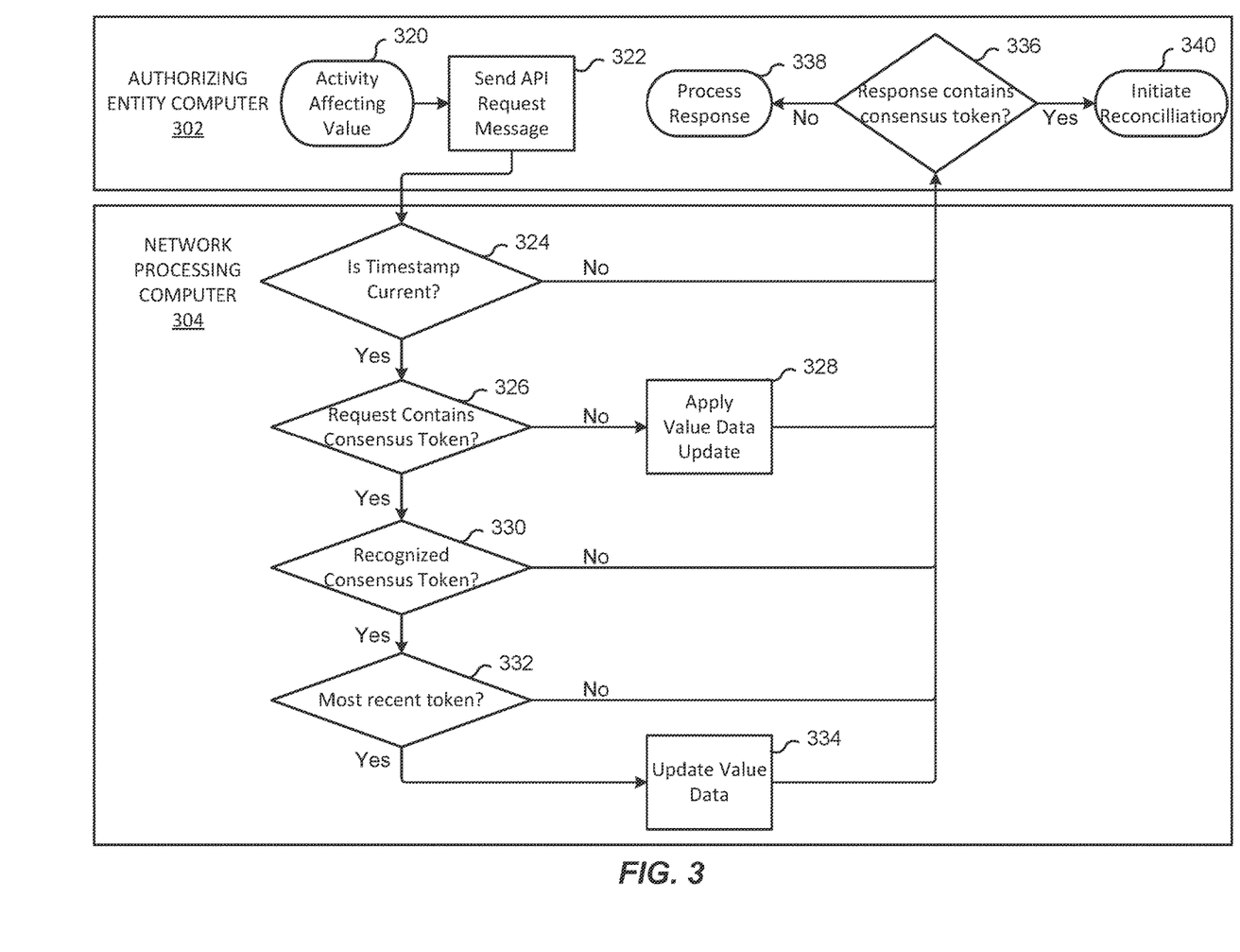
FIG. 3 shows stateless API processing method according to embodiments.

FIG. 3 shows a flowchart of a stateless API processing method according to embodiments. The method illustrated in FIG. 3 will be described in the context of a first computer, which is a network processing computer 304, receiving a stateless API request message from a second computer, which is an authorizing entity computer 302. It is understood, however, that the invention can be applied to other circumstances (e.g., the network processing computer 304 providing a stateless API request message to the authorizing entity computer 302, etc.).

At step 320, the authorizing entity computer 302 (e.g., a second computer) can perform an activity that affects value data. The value data can be a monetary balance maintained for a user, an amount of data available to the user, etc. The authorizing entity computer 302 can perform any suitable activity that affects the value data. For example, the authorizing entity computer 302 can increase the value data. For example, if the value data is an amount of data available to the user (e.g., 30 GB), the authorizing entity computer 302 can increase the value data to a higher value (e.g., 35 GB). In another embodiment, if the value data is an account balance available in a user's account (e.g., $400), the authorizing entity computer 302 can increase the value data to a higher balance (e.g., $500).

As another example, the authorizing entity computer 302 can receive funds from or provide funds to a user at an authorizing entity location (e.g., a banking location) and can update the amount of the value data, which can be a balance, based on the interaction with the user. For example, the user can request an amount (e.g., $10) from a user account associated with the user and maintained by the authorizing entity computer 302. The user may be provided with the amount at the authorizing entity location (or other suitable location). For example, the authorizing entity operating the authorizing entity computer 302 may give cash to the user. The authorizing entity computer 302 can then update the value data. For example, the authorizing entity computer 302 may update the amount of the value data by decreasing the amount of the value data by the amount of cash provided to the user. Thus, the authorizing entity computer 302 has performed an activity that affects the value data. Another example, of the authorizing entity computer 302 performing an action that affects value data is described in respect to FIG. 5 below.

At step 322, the authorizing entity computer 302 can generate and send an API request message to the network processing computer 304. The API request message can be a stateless API request message. As an example, the authorizing entity computer 302 can generate a stateless API request message comprising update value data, a consensus token and a user identifier. The update value data can be an update that was made to the value data during step 320. For example, the update value data can be value data that was updated after the activity affecting the value data. The updated value data can be, for example, a balance.

The consensus token can include a value that can allow two devices to reach consensus on the data associated with the consensus token. In some embodiments, the consensus token can be a value provided by the authorizing entity computer 302 to the network processing computer 304 such that the network processing computer 304 can determine which value data the authorizing entity computer 302 is referencing. In some embodiments, the consensus token can be an alphanumeric value associated with a user. For example, each user of a plurality of users (e.g., operating a plurality of user devices) can be associated with a different consensus token. In some embodiments, a user may have two user accounts maintained by the authorizing entity computer 302. In such a case, the user may be associated with two different consensus tokens (e.g., one consensus token for each user account).

In some embodiments, the consensus token can be a value that references a previous interaction performed by the user of the user account. For example, a user can perform a first interaction (previous) and then later perform a second interaction (current). For the second interaction, the authorizing entity computer 302 can provide, to the network processing computer 304, a consensus token that is equal to a value utilized during the first interaction. The consensus token can be equal to any suitable value stored during the first interaction. For example, the consensus token can be equal to an interaction identifier of the previous interaction (first interaction). In some embodiments, the consensus token can be equal to a concatenation of data values utilized during the previous interaction. For example, the consensus token can be equal to any combination of a previous interaction amount, a previous interaction timestamp, a previous interaction resource provider identifier, a previous interaction index, a previous interaction counter, a previous interaction cryptogram, etc.

The user identifier can include data that identifies the user associated with the value data. The user identifier can be an alphanumeric value that is associated with the user upon creation of the user account. The user identifier can be a token, a primary account number, an email address, a name, etc.

In some embodiments, the stateless API request message can include a timestamp. In some embodiments, at step 324, upon receiving the stateless API request message, the network processing computer 304 can determine if the timestamp is too old (e.g., before a predetermined time). The network processing computer 304 can ignore stateless API request messages that include timestamps older than predetermined times. For example, the network processing computer 304 can ignore stateless API request messages that include timestamps older than 12 hours, 1 day, 3 days, 2 weeks, etc. If the timestamp is acceptable, then the method can proceed to step 326. If the timestamp is not acceptable, then a response may be provided to the authorizing entity computer 302 and the method may proceed to step 336. The response may indicate that no update was performed by the network processing computer 304 and/or that an error occurred.

At step 326, the network processing computer 304 can determine whether or not the stateless API request message includes a consensus token. If the stateless API request message does not include the consensus token, then the network processing computer 304 can perform step 328. The absence of a consensus token may indicate that the authorizing entity computer does not participate in a consensus token program. If the stateless API request message includes the consensus token, the network processing computer 304 can perform step 330.

At step 328, if the stateless API request does not include the consensus token, then the network processing computer 304 can apply the update to the stored value data if the authorizing entity computer 302 does not participate in (or is enrolled in) the consensus token process. In some embodiments, the network processing computer 304 can decide not to update the value data if the stateless API request message does not include the consensus token. For example, if the authorizing entity computer 302 does participate in a consensus token program, but the consensus token is absent, then this could indicate an error.

At step 330, if the stateless API request includes the consensus token, then the network processing computer 304 can determine whether or not the consensus token is recognized. For example, the network processing computer 304 can determine whether or not the consensus token matches a previously stored consensus token. The network processing computer 304 can maintain a database, or other digital storage medium, that includes a plurality of consensus tokens associated with a plurality of users. If the consensus token is recognized (e.g., matches a previously stored consensus token), then the network processing computer 304 can proceed to step 332. If the consensus token is not recognized, then the network processing computer 304 can generate an API response message that indicates that the consensus token is not recognized and then provide the API response message to the authorizing entity computer 302 at step 336.

At step 332, if the consensus token is recognized, then network processing computer 304 can determine whether or not the consensus token is a most recent consensus token. After each interaction, the consensus token can change. For example, in some embodiments, the consensus token can increment by a predetermined value after each interaction. In other embodiments, the consensus token can be an interaction identifier of the previous interaction. As an illustrative example, the user may have previously performed an interaction (e.g., a transaction) with a merchant. The interaction identifier of the previous interaction may be "ABCDEFG." During the current API request, the authorizing entity computer 302 can include the consensus token that is the previously performed interaction's interaction identifier. The network processing computer 304 can determine whether or not the consensus token matches the interaction identifier of the previous interaction of "ABCDEFG." As such, the network processing computer 304 can determine if the received consensus token matches the most recently stored consensus token associated with the user indicated by the user identifier.

If the consensus token does not match the most recent consensus token, the network processing computer 304 can generate an API response message comprising an indication that the consensus token does not match the most recent consensus token stored by the network processing computer 304. In some embodiments, the API response message can also include the latest consensus token stored by the network processing computer 304.

If the consensus token matches the most recent consensus token (e.g., the consensus token is an interaction identifier that matches the most recently (previously) performed interaction's interaction identifier) the network processing computer 304 can proceed to step 334.

At step 334, the network processing computer 304 can update the stored value data. For example, if the consensus token matches the previously stored consensus token, the network processing computer 304 can retrieve stored value data from a value data database based on the user identifier. The network processing computer 304 can then update the stored value data with the update value data. In some embodiments, the user update data can be the newly updated value data of the authorizing entity computer 302 (e.g., $50). In other embodiments, the user update data can be a change in the value data performed by the authorizing entity computer 302 (e.g., +$50).

After updating the stored value data maintained at the network processing computer 304 in a similar manner to the authorizing entity computer 302 updating the value data maintained at the authorizing entity computer 302, the network processing computer 304 can generate API response message comprising an indication of the update. In some embodiments, the indication of the update can include a Boolean value that represents whether or not the update was performed. In other embodiments, the indication of the update can include the consensus token. The network processing computer 304 can transmit the API response message to the authorizing entity computer 302, which is received by the authorizing entity computer 302 at step 336.

At step 336, after receiving the API response message after step 324, 328, 330, 332, or 334, the authorizing entity computer 302 can determine whether or not the API response message includes the consensus token and/or the indication that the update was performed. If the API response message includes the consensus token and/or the indication that the update was performed, the authorizing entity computer 302 can proceed to step 338 to process the response.

If the API response message does not include the consensus token and/or the indication that the update was performed, then the authorizing entity computer 302 can proceed to step 340 to initiate reconciliation to reconcile consensus between the authorizing entity computer 302 and the network processing computer 304.

At step 338, after the authorizing entity computer 302 determines that the API response message includes the consensus token and/or the indication that the update was performed, the authorizing entity computer 302 can process the response. For example, the authorizing entity computer 302 can store the response in any suitable log that includes consensus communications between the authorizing entity computer 302 and the network processing computer 304. Since the authorizing entity computer 302 received the consensus token and/or the indication that the update was performed, the authorizing entity computer 302 can be assured that the network processing computer 304 has stored value data that is equal to the value data stored at the authorizing entity computer 302.

At step 340, after the authorizing entity computer 302 determines that the API response message does not include the consensus token and/or the indication that the update was performed, the authorizing entity computer 302 can initiate consensus reconciliation with the network processing computer 304. In some embodiments, the type of consensus reconciliation between the authorizing entity computer 302 and the network processing computer 304 depends upon the contents of the API response message.

For example, after step 332, the network processing computer 304 creates an API response message that includes the latest consensus token known by the network processing computer 304. The latest consensus token can be a previous interaction identifier of "0006."

In such a case, the authorizing entity computer 302 can evaluate the received latest consensus token known by the network processing computer 304. If the received latest consensus token of "0006" is not known by (e.g., previously stored by) the authorizing entity computer 302, then the authorizing entity computer 302 can request the network processing computer 304 to provide updates as to interactions that occurred with the network processing computer 304, but not known to the authorizing entity computer 302. For example, the latest consensus token known by the authorizing entity computer 302 may be an interaction identifier of "0005." The authorizing entity computer 302 has not yet received information regarding the interaction with the interaction identifier of "0006." For example, the network processing computer 304 may have authorized an interaction (with interaction identifier "0006") for the same user prior to the current process of steps 320-340, but may not have yet provided an update to the value data to the authorizing entity computer 302. To reach consensus, the network processing computer 302 can perform the steps performed by the first computer 408 in FIG. 4.

As another example, the authorizing entity computer 302 may have submitted an API request message with a consensus token of "0007" for an interaction with an interaction identifier of "0008." However, in the API response message, the authorizing entity computer 302 can receive the latest consensus token ("0006") known by the network processing computer 304. This may happen because, the network processing computer 304 has not yet received information regarding the previous interaction with the interaction identifier of "0007." In such a case, the authorizing entity computer 302 can provide a new API request message (similar to step 322) that includes a consensus token of "0006" for the missed interaction (with interaction identifier "0007") to the network processing computer 304. After performing the steps of FIG. 3 with the consensus token of "0006" for the interaction with the interaction identifier of "0007," the authorizing entity computer 302 can re-submit the API request message with the consensus token of "0007" for the interaction with the interaction identifier of "0008." During this second submission of the consensus token of "0007," the network processing computer 304 can compare the consensus token of "0007" with the previous interaction identifier of "0007," which match. The network processing computer 304 can then update and send a response indicating the update to the authorizing entity computer 302.

In some embodiments, if the authorizing entity computer 302 received an API response message (e.g., after steps 324, 328, or 330), the authorizing entity computer 302 can generate an alert to notify a user of the authorizing entity computer 302 of a lack of consensus between the authorizing entity computer 302 and the network processing computer 304.

Figure 4:
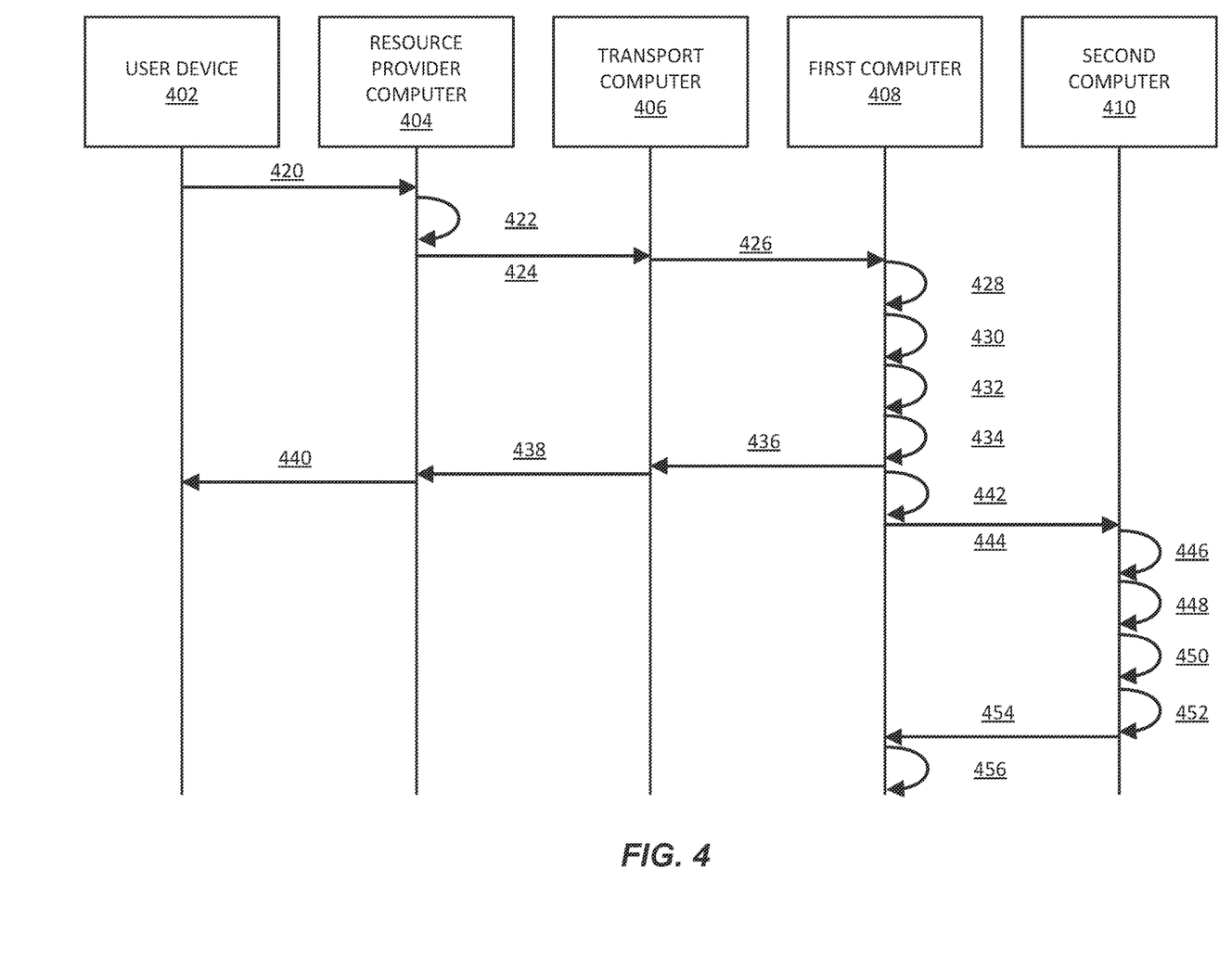
FIG. 4 shows a flowchart of a first interaction processing method according to embodiments.

FIG. 4 shows a flowchart of a first interaction processing method according to embodiments. The method illustrated in FIG. 4 will be described in the context of a user performing an interaction with a resource provider, where the interaction is qualified to be authorized by a first computer 408 (e.g., a network processing computer) on behalf of a second computer 410 (e.g., an authorizing entity computer). The interaction between the user and the resource provider can be a data transfer interaction. For example, the user can request the resource provider computer 404 to transfer an amount of data to the user device 402.

At step 420, the user device 402 can transmit a user identifier and a user credential to the resource provider computer 404 for the interaction. In some embodiments, the user device 402 can also provide interaction data for the current interaction to the resource provider computer 404. The interaction data can include an interaction amount, information associated with the user and/or the user device 402 (e.g., a token, account information, or a credential, an alias, a device identifier, a contact address, etc.), information associated with the resource provider and/or the resource provider computer 404 (e.g., an alias, a device identifier, a contact address, etc.), one-time values (e.g., a random value, a nonce, a timestamp, a counter, etc.), and/or any other suitable information. An example of an interaction can be a data transfer. The interaction data for the data transfer can include an interaction amount, which indicates an amount of data to transfer. For example, the interaction amount can be 5 GB of data. The interaction data for the data transfer can also include an identifier that identifies what data to transfer, a user credential (e.g., a token) of the user requesting the data transfer, and a cryptogram associated with the token. In another example, the interaction amount may be five dollars, and the user credential may be a primary account number or a payment token.

At step 422, after receiving the user identifier, the amount, and the user credential, the resource provider computer 404 can generate an authorization request message comprising the interaction data, the user identifier, and the user credential.

At step 424, after generating the authorization request message, the resource provider computer 404 can provide the authorization request message to the transport computer 406.

At step 426, after receiving the authorization request message from the resource provider computer 404, the transport computer 406 can provide the authorization request message to the first computer 408.

At step 428, after receiving the authorization request message from the transport computer 406, the first computer 408 (e.g., a network processing computer) determines whether or not the interaction is one that can be authorized by the first computer 408 rather than the second computer 410. For example, the interaction can qualify as one that is to be authorized by the first computer 408 if the amount of the interaction is less than a predetermined amount, if the user identifier is included in a list of qualified user identifiers, if a resource provider computer identifier is included in a list of qualified resource provider computer identifiers, etc.

If the interaction is not qualified for authorization by the first computer 408, then the first computer 408 can provide the authorization request message to the second computer 410 for authorization (not shown). If the interaction is qualified for authorization by the first computer 408, then the first computer 408 can proceed to step 430.

In some embodiments, if the first computer 408 receives a token in the authorization request message, then the first computer 408 can provide the token to a token provider computer (not shown) to request an account number (or other user credential) that is stored in association with the token by the token provider computer. The token provider computer can provide the user credential to the first computer 408 for further processing.

At step 430, the first computer 408 can determine whether or not to authorize the interaction between the user and the resource provider. The first computer 408 can determine whether or not to authorize the interaction based on any suitable data stored by the first computer 408 including, but not limited to, user identifiers, resource provider identifiers, fraud rates, risk scores, and/or location data. The first computer 408 can generate an indication of whether or not the interaction is authorized. The first computer 408 can maintain value data regarding the user. The value data can be an amount available to the user. For example, in the interaction, the user may be requesting that 5 GB of data be deducted from the user's account. The first computer 408 can compare the amount of the interaction to the value data stored by the first computer 408. For example, the value data can be a value of 30 GB. The first computer 408 can authorize the interaction, if the amount of the interaction is less than or equal to the value data. In another example, if the interaction amount is five dollars, then the first computer 408 can compare this amount to the value data stored by the first computer 408. For example, the value data can be a value of twenty dollars. The first computer 408 can then authorize the interaction, since the interaction amount is less than the value data stored at the first computer 408.

At step 432, the first computer 408 can update the value data based on the amount authorized for the interaction. For example, the value data (e.g., 30 GB) can be updated with the amount (e.g., 5 GB) to determine updated value data (e.g., 25 GB). In another example, the value data (e.g., twenty dollars) can be updated with the amount (e.g., five dollars) to determine updated value data (e.g., fifteen dollars).

At step 434, the first computer 408 can generate an authorization response message comprising the indication of whether or not the interaction is authorized. In some embodiments, the authorization response message can also include the interaction data, the user identifier, and/or the user credentials.

At step 436, the first computer 408 can transmit the authorization response message to the transport computer 406.

At step 438, after receiving the authorization response message from the first computer 408, the transport computer 406 can transmit the authorization response message to the resource provider computer 406.

At step 438, after receiving the authorization response message from the transport computer 406, the resource provider computer 404 can provide the authorization response message to the user device 402. In some embodiments, the resource provider computer 404 can provide the indication of whether or not the interaction is authorized to the user device 402.

If the interaction is a payment transaction, a clearing and settlement process may take place between the transport computer 406, the first computer 408, and the second computer 410 at a later time.

At step 442, after generating the authorization response message, the first computer 408 can generate an API request message. The API request message can be a stateless API request message. The API request message can include update value data, a consensus token and the user identifier. The update value data can include data relating to the change in value data due to an interaction. In some embodiments, the update value data can be the updated value data determined at step 432 (e.g., 25 GB, fifteen dollars). In other embodiments, the update value data can be the amount used to update the value data at step 432 (e.g., 5 GB, or minus five dollars).

In some embodiments, the consensus token can be an interaction identifier of the previous interaction. In some embodiments, an interaction identifier can be a universally unique identifier (UUID). An interaction identifier can be assigned to an interaction at any point during authorization processing of the interaction. For example, the interaction identifier can be created when the authorization request message is created, and included therein. As another example, the interaction identifier can be created when the interaction is authorized.

The user identifier included in the API request message can be the same user identifier received in the authorization request message. If no user identifier is received in the authorization request message, then the first computer 408 can determine the user identifier based on the user credentials received in the authorization request message.

At step 444, after generating the API request message, the first computer 408 can provide the API request message to the second computer 410. In some embodiments, the second computer 410 can be an authorizing entity computer.

At step 446, after receiving the API request message, the second computer 410 can determine whether or not the consensus token matches a previously stored consensus token.

At step 448, if the consensus token matches a previously stored consensus token, the second computer 410 can retrieve (second computer maintained) stored value data from a value data database based on the user identifier.

At step 450, after retrieving the stored value data, the second computer 410 can update the stored value data with the update value data received in the API request message. For example, the second computer 410 can update the value data (e.g., 30 GB) with the update value data (e.g., −5 GB) to determine updated value data (e.g., 25 GB).

In some embodiments, if the second computer 410 updates the stored value data, then the second computer 410 can generate an indication of the update (e.g., a data value that indicates that an update was performed). In some embodiments, the indication of the update can include the consensus token.

At step 452, after updating the stored value data, the second computer 410 can generate an API response message comprising the indication of the update.

At step 454, after generating the API response message, the second computer 410 can transmit the API response message to the first computer 408.

At step 456, after receiving the API response message, the first computer 408 can store the indication of the update. In some embodiments, unless already stored, the first computer 408 can store the interaction identifier of the present interaction as the consensus token that is subsequent to the currently utilized consensus token.

Figure 5:
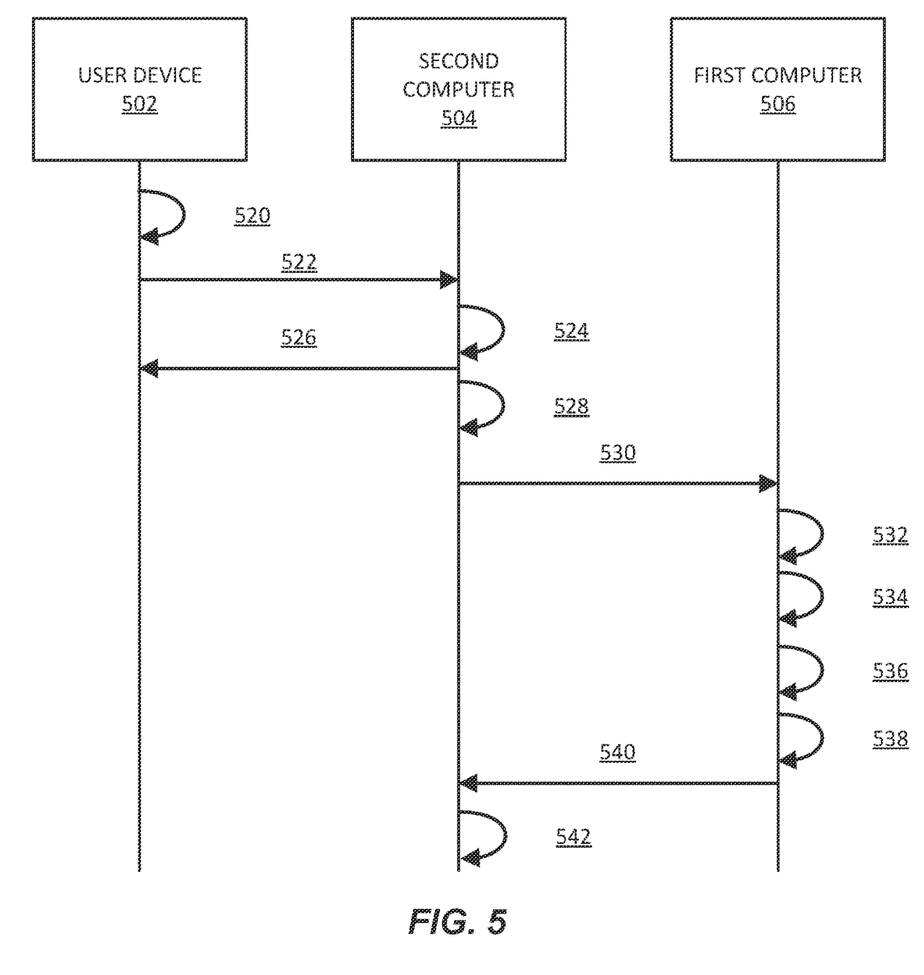
FIG. 5 shows a flowchart of a second interaction processing method according to embodiments.

FIG. 5 shows a flowchart of a second interaction processing method according to embodiments. The method illustrated in FIG. 5 will be described in the context of a user of a user device 502 providing funds to a user account maintained by the second computer 504. It is understood, however, that the invention can be applied to other circumstances (e.g., removing funds, transferring funds between user accounts, etc.).

At step 520, the user device 502 can generate a fund addition request message to provide funds to the second computer 504. For example, the user device 502 can store an amount of an offline balance, a digital currency, a digital cryptocurrency, etc. in a secure memory, and may provide the amount of the offline balance, the digital currency, the digital cryptocurrency, etc. to the second computer 504 in the fund addition request message. The fund addition request message can also include a user identifier. The additional fund request could also be an online bank transfer that transfers funds from one financial institution (not shown in FIG. 5) that is used by the user to another financial institution that operates the second computer 506.

At step 522, after generating the fund addition request message, the user device 502 can provide the fund addition request message to the second computer 504. As an illustrative example, the fund addition request message can include an amount of $100.

At step 524, after receiving the fund addition request message from the user device 502, the second computer 504 can update value data using the amount (e.g., of the offline balance, the digital currency, the digital cryptocurrency, etc.). The value data can be a balance associated with the user account. For example, the balance can be a value of $500. The second computer 504 can update the balance of $500 with the amount of $100 to determine an updated balance of $600.

At step 526, after updating the value data, the second computer 504 can transmit a notification to the user device 502 that notifies that user that the value data was updated.

At step 528, after updating the value data, the second computer 504 can also generate a stateless API request message comprising update value data. The update value data can be an amount of $100, which was used to update the value data. The stateless API request message can also include a consensus token and a user identifier. The consensus token can be a value that updates after each interaction. For example, the consensus token can be a value that was utilized in and/or created during the previous interaction. In some embodiments, the consensus token can be a interaction identifier of the previous interaction. For example, the user of the user device 502 may have previously performed a transaction that involved the use of the second computer 504 and the first computer 406, and that had a transaction identifier of "00012345." For example, the first computer 506 may be a network processor computer and the second computer may be an authorizing entity computer as described above, and the prior transaction may have been a payment card transaction that includes an authorization request message that passed to the authorizing entity computer via the processor network computer. The second computer 504 can retrieve the previous transaction identifier of "00012345" from a memory or a database. The second computer 504 can include the previous transaction identifier of "00012345" into the stateless API request message as the consensus token.

At step 530, after generating the stateless API request message, the second computer 504 can provide the stateless API request message to the first computer 506.

Steps 532-542, performed by the first computer 506, are similar to steps 446-456, performed by the second computer 410 in FIG. 4, and will not be repeated in detail here. At step 532, after receiving the stateless API request message, the first computer 506 can determine whether or not the consensus token matches a previously stored consensus token. At step 534, if the consensus token matches a previously stored consensus token, the first computer 506 can retrieve stored value data from a value data database based on the user identifier. At step 536, the first computer 506 can update the stored value data with the update value data. At step 538, the first computer 506 can generate an API response message comprising the indication of the update (e.g., the consensus token). At step 540, the first computer 506 can transmit the API response message to the second computer 504. At step 542, the second computer 504 can store the API response message if the API response message includes the indication of the update. If the API response message does not include the indication of the update, then the second computer 504 can initiate a reconciliation process, as described herein.

In some embodiments, the requesting computer (e.g., the second computer 504) can provide the same stateless API request message more than one time since the second computer 504 may not receive an response message, or may send two or more stateless API request messages by mistake. In such a case, the first computer 506 can receive the second stateless API request message comprising second update value data, a second consensus token, and the user identifier. The second consensus token can be the same as the first consensus token received in the first stateless API request message since the second stateless API request message was provided in error. Similarly, the second update value data is the same as the first update value data. If the first stateless API request message can be received within a predetermined amount of time as the second stateless API request message, then the first computer 506 can compare the two received consensus tokens. For example, the first computer 506 can determine whether or not the second consensus token matches the first consensus token. If the second consensus token matches the first consensus token, then the first computer 506 can generate a second API response message comprising an indication of an error that the first consensus token is received twice. The first computer 506 can then transmit the second API response message to the second computer 504.

Embodiments of the disclosure have a number of advantages. Embodiments provide for stateless API communication in an efficient manner to reach consensus on distinct value data stored by different computers. Typically, for a consensus process to occur, a stateful API communication channel or a instantiated communication session is needed to reach consensus between the computers. Embodiments provide for the advantage of computers reaching consensus on value data in a stateless manner. Specifically, a stateless API request and response can be utilized to reach consensus. Utilizing stateless API communication provides for less complexity in establishing resource heavy secure communication sessions. Furthermore, utilizing stateless API communication provides for ease of communication processing, since the API response can be the same after each API request (e.g., stateless) unless an error message is provided (e.g., the consensus token does not match).

Embodiments further solve a technical problem when utilizing stateless API communication to reach consensus. The technical problem is that during a stateless API request, the requesting computer may not know the outcome of the request (e.g., because it is stateless). The requesting computer may submit the same request again in order to ensure that the responding computer received the stateless API request message. This can be problematic because responding computer may receive both API request messages and then update the value data twice. Embodiments solve this technical problem (so called a double spending problem) by tying the consensus token (provided in the API request message) to a previous interaction identifier. This solves the technical problem because the responding computer can determine that the two different API request messages both include the same consensus token (e.g., both are tied to the previous interaction identifier). The responding computer can update the stored value data once rather than twice, thus eliminating the double spending problem in stateless API communication systems.

Although the steps in the flowcharts and process flows described above are illustrated or described in a specific order, it is understood that embodiments of the invention may include methods that have the steps in different orders. In addition, steps may be omitted or added and may still be within embodiments of the invention.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
   authorizing, by a second computer, an amount for an interaction performed by a user of a user device associated with a user identifier;
   updating, by the second computer, first stored value data based on the amount; generating, by the second computer, a stateless API request message comprising update value data, a consensus token, and the user identifier;
   providing, by the second computer, the stateless API request message to a first computer, wherein the first computer determines whether or not the consensus token matches a previously stored consensus token, and if the consensus token matches the previously stored consensus token, updates second stored value data with the update value data, and generates an API response message; and
   receiving, by the second computer, the API response message from the first computer including an indication of the update, and wherein the method further comprises, after authorizing:
   transmitting a notification to the user device that notifies the user of the amount for the interaction was updated, and
   wherein the previously stored consensus token is an interaction identifier for a previous interaction.

2. The method of claim 1, wherein the interaction is a fund addition.

3. The method of claim 1, further comprising:
   receiving, by the second computer, an addition request message comprising the user identifier.

4. The method of claim 1, wherein the user device is a mobile phone.

5. The method of claim 1, wherein the second computer is a processing network computer and the first computer is an authorizing entity computer.

6. The method of claim 1, further comprising:
   storing, by the second computer, the API response message.

7. The method of claim 1, wherein the second computer is an authorizing entity computer and the first computer is a processing network computer.

8. The method of claim 1, wherein the stored value data is an account balance.

9. The method of claim 1, wherein the interaction is a transaction and the amount is a transaction amount.

10. A second computer comprising:
    a processor; and
    a computer-readable medium coupled to the processor, the computer-readable medium comprising code executable by the processor for implementing a method comprising: authorizing an amount for an interaction performed by a user of a user device associated with a user identifier;
    updating first stored value data based on the amount;
    generating a stateless API request message comprising update value data, a consensus token, and the user identifier;
    providing the stateless API request message to a first computer, wherein the first computer determines whether or not the consensus token matches a previously stored consensus token, and if the consensus token matches the previously stored consensus token, updates second stored value data with the update value data, and generates an API response message; and receiving the API response message from the first computer including an indication of the update, and wherein the method further comprises, after authorizing:

transmitting a notification to the user device that notifies the user of the amount for the interaction was updated, and wherein the previously stored consensus token is an interaction identifier for a previous interaction.

11. The second computer of claim 10, wherein the update value data is the amount and wherein the consensus token is a previous interaction identifier.

12. The second computer of claim 10, wherein the second computer is an authorizing entity computer and wherein the first computer is a network processing computer.

13. The second computer of claim 10, wherein the indication of the update indicates whether or not the first stored value data was updated by the first computer.

14. The second computer of claim 10, wherein the method further comprises:

receiving an addition request message comprising the user identifier.

15. The second computer of claim 10, wherein the method further comprises:

storing, by the second computer, the API response message.

16. The second computer of claim 10, wherein the second computer is an authorizing entity computer.

17. The second computer of claim 10, wherein the first computer is a processing network computer.

18. The second computer of claim 10, wherein the user identifier is an account identifier.

* * * * *